Nov. 24, 1931.   W. A. CLENCH   1,832,894
RIM SECURING MEANS
Filed March 18, 1926   3 Sheets-Sheet 2

Inventor
William A. Clench
By H. L. & A. L. Reynolds
Attorneys

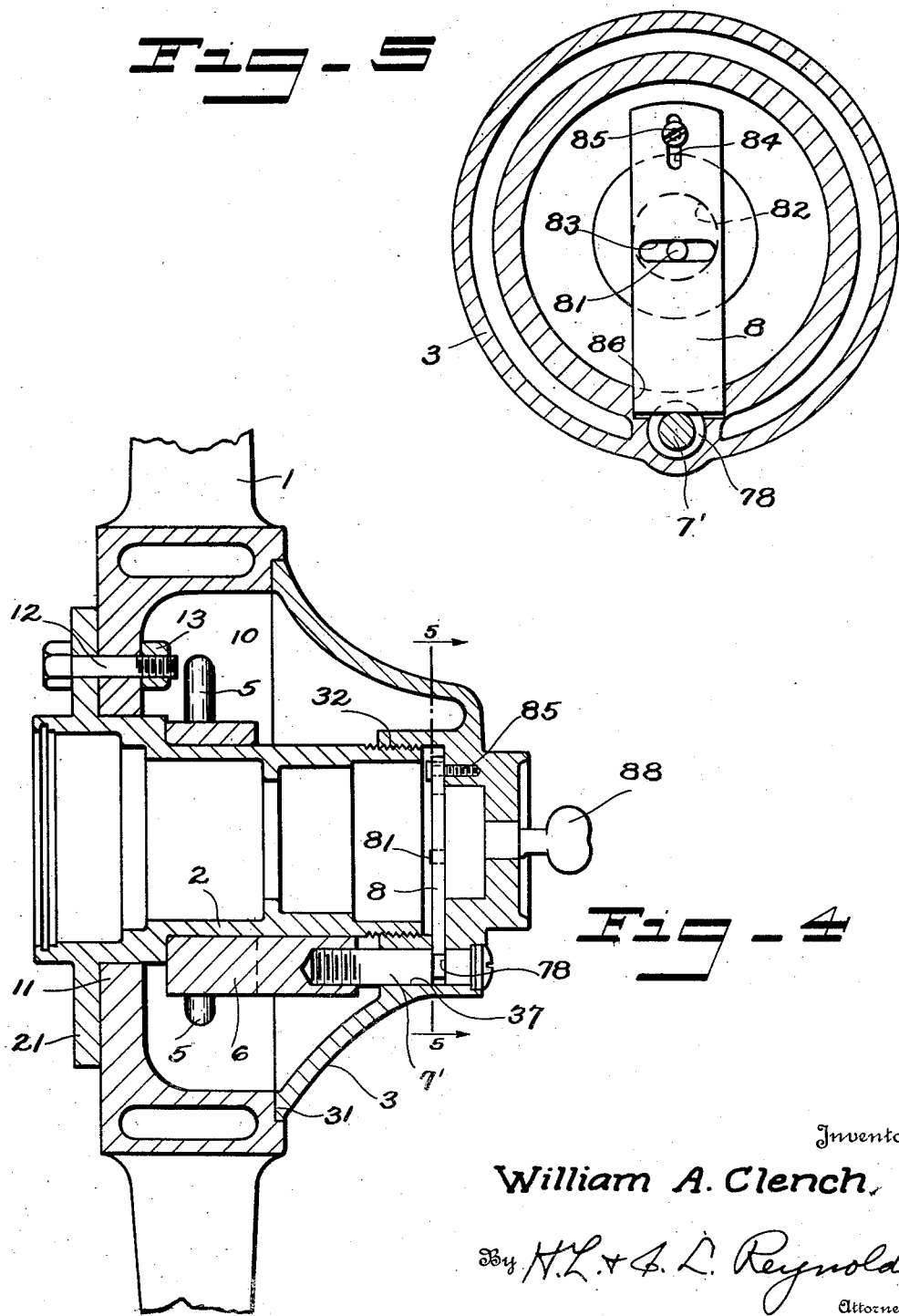

Patented Nov. 24, 1931

1,832,894

UNITED STATES PATENT OFFICE

WILLIAM A. CLENCH, OF SEATTLE, WASHINGTON, ASSIGNOR TO STANDARD DISK WHEEL COMPANY, OF SEATTLE, WASHINGTON, A CORPORATION OF WASHINGTON

RIM SECURING MEANS

Application filed March 18, 1926. Serial No. 95,621.

My present invention is of the same nature as that shown in my Patent No. 1,707,458, Case E, and is a continuation in part thereof.

The present invention relates particularly to the type of securing means for the hub cap and actuator, and for these two parts relative to the wheel itself, wherein no absolute lock need be employed but in which means are provided which will act as a deterrent against unauthorized operation of the rim lock or removal of the entire wheel. Also, as in the former case referred to, these means will serve to retain the hub cap in place upon the hub of the wheel.

It is an important object of my invention, then, to provide a simple, yet effective, means of securing together the rim lock actuator and the hub cap so that the former may be moved to operate the rim lock by limited movement of the latter, and also to provide means whereby both may be fixed relative to the wheel itself.

In accomplishing the latter object, two advantages are obtained. In the first place such a means acts to deter one not possessed of the proper tool from attempting to remove the rim, tire and wheel; and in the second place it insures that the hub cap will not be lost and that the rim lock actuator will be held in rim-secured position.

It is a further object to provide a rim lock by means of which the rim can be forced into place upon the wheel felly in such a way that it will be held in the proper plane and forced properly to its seat, and there retained by the locking means.

My invention comprises the novel parts and combinations thereof, as shown in the accompanying drawings, described in the specification, and particularly defined by the claims terminating the same.

In the accompanying drawings I have shown my invention in various forms illustrating alternative embodiments of my invention.

Figures 3 and 4 are views similar to Figure 1 showing modified constructions.

Figure 5 is a section on line 5—5 of Figure 4.

My invention is shown in association with a cast metal wheel. In the form shown in all of the figures except Figure 4, the invention is applied to a double disk wheel. Figure 4 shows it applied to a spoke wheel. It will be obvious that the present invention may be incorporated in various types of wheel and is not necessarily associated with any one particular type.

Figure 1:
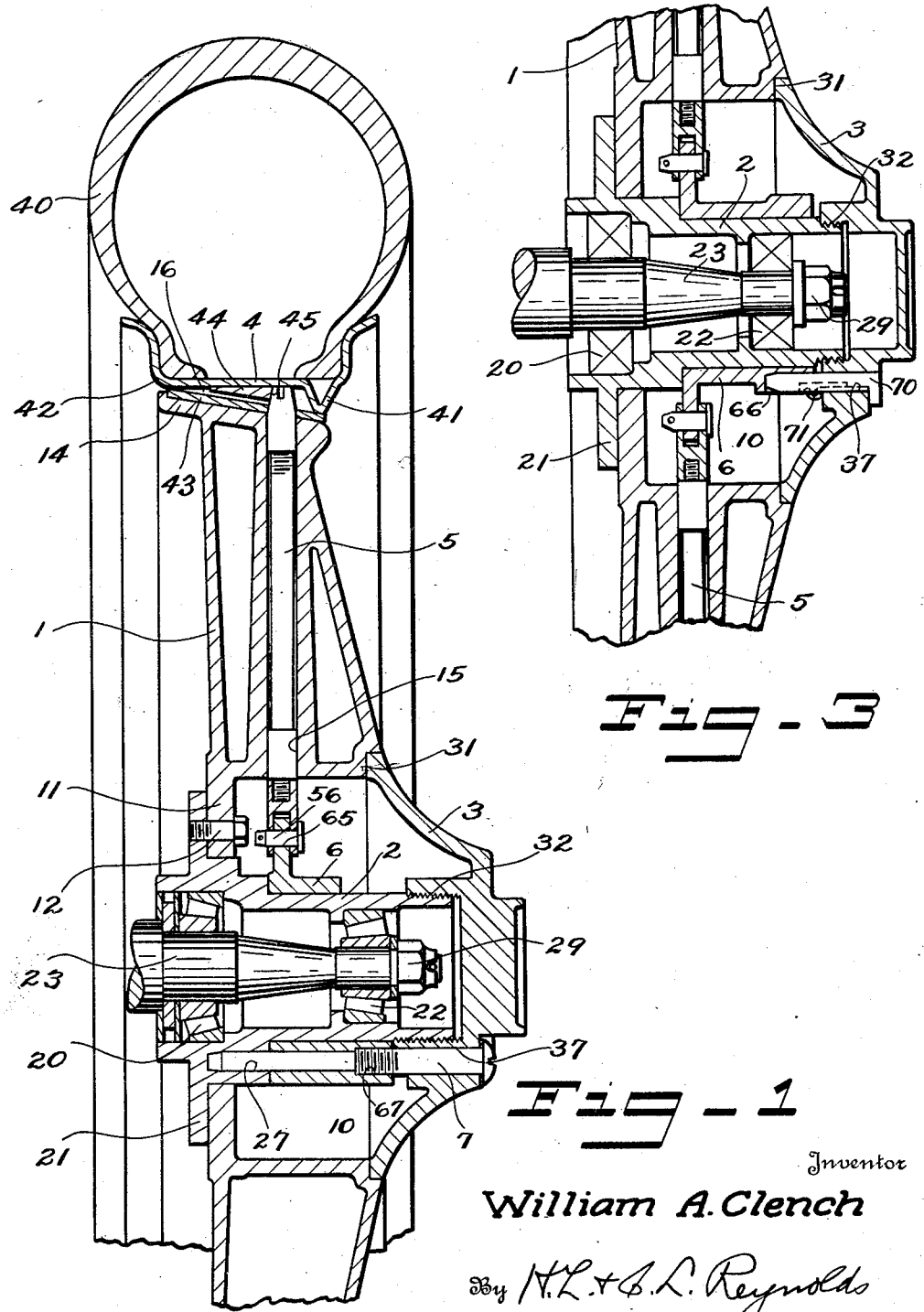
Figure 1 is an axial section through a tire, rim and wheel including the hub portion and lock therefor, along the line 1—1 of Figure 2.

The wheel body, generally designated by the numeral 1, has an axial chamber 10 open at its forward end but preferably having its rear end closed, as by the wall 11. Projecting into the chamber 10 is a hub member 2, and while this is formed separate from the wheel with a flange 21 adapted to be secured to the wall 11 of the hub chamber, as by bolts 12, yet the hub might be formed integral with the wheel itself. Associated with the hub, as is usual, are the bearing 20 and 22, by means of which the wheel is mounted upon the axle 23. It will be noted that the bolts 12, as shown in Figure 1, are accessible for removal only from within the chamber 10, and the same is true of the hub nut 29. As shown in Figure 5, the nuts 13, which secure the bolts 12 in place, are accessible only from within the chamber 10.

To close the open outer end of the hub chamber 10, a hub cap 3 is employed. This may be secured to the hub or to the wheel itself. Preferably it is threaded, as indicated at 32, upon the projecting end of the hub 2, and bears at 31 within a recess in the wheel body 1. It is immaterial, however, in what manner the hub cap is secured in place, although it must be removable and must be movable relative to the wheel body 1 to a limited extent without being thereby entirely removed. Thus, in effect, the hub cap 3 is secured to the wheel itself inasmuch as the hub 2 forms in effect an integral part of the wheel 1.

The usual rim 4 is employed, this being demountable from the felly 14 of the wheel body. As best shown in Figure 1, the rim is, in the main, channel shaped to receive the tire 40, but is provided with depending lugs 41 pressed from one edge of the channel, or these lugs may be, and preferably are, extended to form a continuous flange. The felly 14 is inclined, hence the one edge 42 of the rim rests upon the upper side of the felly while the flange 41 rests upon its lower side. A gasket 43 may be employed to prevent rattling. The under side of the rim is provided at intervals with inclined lugs 44 which have their outer faces 45 also slightly inclined.

Locking bolts 5 are guided in the wheel 1 or in guides 15 thereof for radial movement. The tips of these bolts are inclined to correspond to the inclined edge 45 of the lugs 44. Thus when the bolts 5 are projected, their inclined tips will engage the edges 45 and will force the rim back securely into position upon the felly 14. The weight of the vehicle is transmitted through the wheel to the tire by means of the flange 41 and edge 42 of the rim, which are thus brought to bear firmly upon the inclined felly 14. It will be observed that the lug 44 does not contact with the felly 14 but may serve as a guide to position the rim and to transmit torque, engaging the side edges of the transverse slots 16 in the felly.

The means for actuating the locking bolts is located within the chamber 10. To some extent, and so far as the present invention is concerned, the precise form of the actuating means is immaterial. However, as shown here, and as shown in my previous application cited above, it comprises an actuator ring 6 mounted upon the hub to oscillate thereabout and having cam slots 65 to receive pins 56 secured in the inner ends of the locking bolts 5. By these or like means, the locking bolts can be simultaneously reciprocated, either to be withdrawn or projected by limited oscillation of the actuator 6. In order to connect the actuator 6 and the hub cap 3 various means may be employed. The preferred means in connection with the present invention are as shown in Figure 1 wherein a bolt 7 is received with a hole 37 in the hub cap and screws into a hole 67 alined therewith in the actuator 6. The bolt may stop here, as shown in Figure 4, but preferably extends through the actuator and into a socket 27 in the rear wall of the chamber 10 either in the hub 2 or in the wall 11. By this means not only is the actuator connected to the hub cap 3 for movement therewith upon withdrawal of the bolt from its socket 27, but when the bolt is screwed home into its socket 27 movement of the hub cap 3 and of the actuator 6 relative to the wheel 1 or hub 2 is prevented. This effectually prevents the reaction due to engagement of the inclined tip of the locking bolts with the lug end 45, or due to the inclination of the felly and rim from reversing the actuator 6, permitting the locking bolts to be withdrawn, and thus permitting accidental removal of the tire and rim.

It is not to be understood that the present form of the invention is intended as a positive and absolute preventative against theft, either of the tire and rim or of the wheel, but if it is made necessary to produce a screw driver or some special tool to remove or withdraw the bolt 37, the casual theft of either the tire or the wheel is deterred, if not prevented. Unless the hub cap 3 is removed, or turned relative to the wheel, it is clear that the locking bolts 5 cannot be withdrawn, nor can the wheel be removed from the hub or from the axle.

In Figure 3, I have shown a pin 70 passing through the hole 37 and the hub cap 3 to be received in a socket 66 in the actuator 6; a spring 71 serves to prevent accidental withdrawal of the pin 70, although this can be removed readily by prying outward beneath its head. This form of the device serves chiefly to retain the hub cap 3 in place, for with the hub cap and actuator thus connected, the locking bolts 5 can be readily projected or retracted by application of a wrench to the hub cap 3.

In Figures 4 and 5 the bolt 7' has been shown as terminating in the actuator 6 and as provided with a groove 78 adapted for the reception of a lock bar 8. The lock bar 8, as is best shown in Figure 5, is controlled by a pin 81 eccentrically placed relative to a locking cylinder 82 received in the hub cap and engageable in a transverse slot 83 of the bar 8. A longitudinal slot 84 and a pin 85 passing into and received in the hub cap, together with a slot 86 affording access to the bolt aperture 37, guides the bar for its movement into and out of engagement with the groove 78. By these or like means a key 88 may be employed to permit or prevent withdrawal of the bar 8, and consequently the withdrawal of the bolt 7'. However, as shown in Figure 4 the locking bolts 5 may still be projected or retracted by oscillation of the hub cap 3, but if the bolts 7' were provided with an extension seated in a socket, as shown in Figure 1, such a means would positively lock the hub cap 3 and the actuator 6 against movement.

Figure 2:
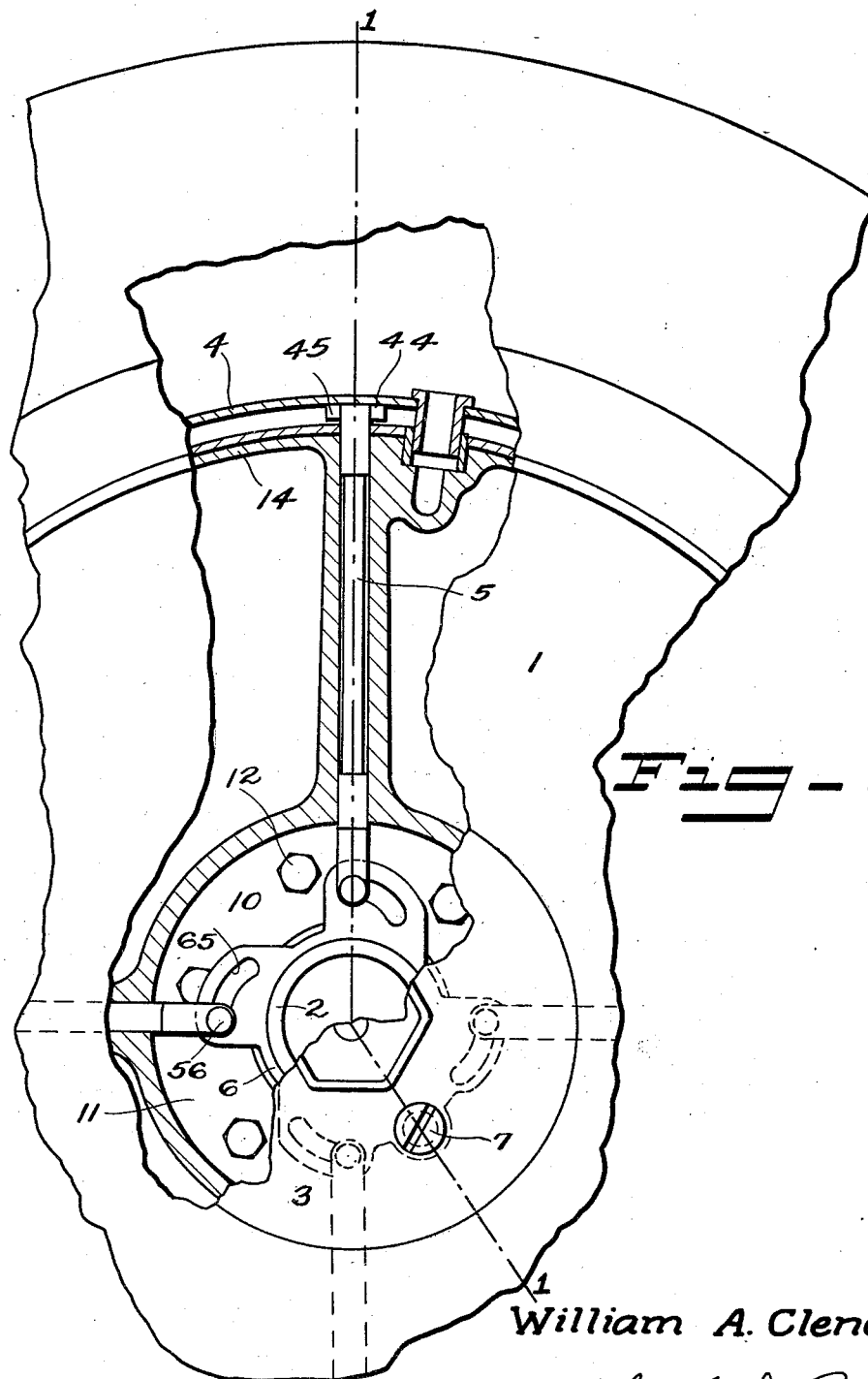
Figure 2 is a view, partly in elevation and partly in section, showing my invention in side elevation.

It is my intention to eliminate the necessity of using a key in the actuation of the present rim lock, however, and for that reason I prefer the form shown in Figures 1 and 2.

What I claim as my invention is:

1. In combination with a vehicle wheel including an axial open-ended chamber, rim locking means extending within said chamber, actuator means within said chamber and movable relative to the wheel, and operatively connected to said rim locking means, a hub cap closing the end of said chamber, and a bolt securable in the actuator and the hub cap, and accessible from without the hub cap, to secure the hub cap and actuator together for operation of the rim lock through movement of the connected actuator and hub cap, the wheel chamber having a socket to receive the end of the bolt, said bolt, when seated in said socket, constituting means for preventing relative movement of the hub cap, actuator, and wheel.

2. In combination with a vehicle wheel having a hub chamber, a rim removably securable upon the felly of said wheel, means operable from within said chamber for securing or releasing said rim, means for closing said chamber, and a bolt passing through said two means to connect them for actuation of the former by the latter, said bolt being securable also in said wheel to prevent movement of said means relative thereto.

3. In combination with a hub, a vehicle wheel having an axial hub chamber open at one end, and receiving and surrounding said hub, a hub cap threading upon the end of said hub and closing the open end of said chamber, rim locking means extending within said chamber, an actuator within said chamber and rotatable about the hub to actuate said rim lock, and a bolt threading in said actuator and passing through said hub cap to be accessible outside of the same, and said hub having a socket for the reception of said bolt, whereby movement of the hub cap and actuator relative to the hub may be prevented or permitted.

4. In combination with a flanged hub, a vehicle wheel having an axial hub chamber open at its outer end, and receiving and surrounding said hub, hub-securing means passing through the flange of said hub and the rear wall of said chamber, and accessible only from within the chamber, a hub cap threading upon the end of said hub and closing the open end of said chamber, a bolt passing through said hub cap and accessible from without it, and means in said chamber engageable with the inner end of said bolt to prevent relative movement between the hub cap and wheel prior to release of said bolt.

Signed at Seattle, Washington, this 10th day of March, 1926.

WILLIAM A. CLENCH.